(12) United States Patent
Barrow et al.

(10) Patent No.: US 10,000,105 B2
(45) Date of Patent: Jun. 19, 2018

(54) VENTILATION DUCT FOR A MOTOR VEHICLE

(71) Applicant: Honda Motor Co., Ltd., Tokyo (JP)

(72) Inventors: Andrew Edward Barrow, Hilliard, OH (US); Jason Dilley, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 15/075,499

(22) Filed: Mar. 21, 2016

(65) Prior Publication Data

US 2017/0267061 A1 Sep. 21, 2017

(51) Int. Cl.
*B60H 1/34* (2006.01)
*B60H 1/00* (2006.01)

(52) U.S. Cl.
CPC ........... *B60H 1/00564* (2013.01); *B60H 1/34* (2013.01); *B60H 2001/00635* (2013.01); *B60H 2001/3492* (2013.01)

(58) Field of Classification Search
CPC ............................ B60H 1/34; B60H 1/00564
USPC ........................................................ 454/152
See application file for complete search history.

(56) References Cited

U.S. PATENT DOCUMENTS

| 2,933,334 | A | 4/1960 | Moude |
| 4,767,137 | A | 8/1988 | Zinner et al. |
| 6,857,681 | B2 | 2/2005 | Nakajima |
| 7,147,554 | B1 | 12/2006 | Berger |
| 7,442,120 | B2 | 10/2008 | Poirier |
| 8,449,359 | B2 | 5/2013 | Tani et al. |
| 8,449,389 | B2 | 5/2013 | Tani et al. |
| 2009/0042506 | A1* | 2/2009 | Tani ................ B60H 1/00514 454/339 |
| 2012/0086176 | A1* | 4/2012 | Kondou ............. F16J 15/067 277/631 |
| 2014/0091570 | A1 | 4/2014 | Strutt |

* cited by examiner

*Primary Examiner* — Steven B McAllister
*Assistant Examiner* — Allen Schult
(74) *Attorney, Agent, or Firm* — Honda Patents & Technologies North America, LLC; Mark E. Duell

(57) ABSTRACT

A ventilation duct for a motor vehicle includes an air inlet, a duct body, and a duct opening generally in a shape of a quadrilateral having first, second, third, and fourth sides. The duct opening further includes a generally L-shaped extension extending away from the first and second sides of the duct body, and a first seal attached to the L-shaped extension. The ventilation duct further includes an outlet generally in the shape of the quadrilateral of the duct opening. The outlet further includes an outlet assembly, a generally L-shaped seal extension, and a second seal affixed to the L-shaped seal extension. The outlet is installed in the duct body in a direction perpendicular to the airflow to maintain the seal around the assembly point.

5 Claims, 7 Drawing Sheets

VENTILATION DUCT FOR A MOTOR VEHICLE

TECHNICAL FIELD

The embodiments described herein are directed to a ventilation duct and a method of assembling a ventilation duct for a motor vehicle.

BACKGROUND

In the past, vehicle ventilation ducts have been defined by the use of a circular flange that connects to a corresponding circular outlet assembly. This connection is facilitated by extending an outer portion of the circular flange within a corresponding channel defined in the outlet assembly, and in particular in a circular ethylene propylene rubber seal that extends around the perimeter of outlet assembly facing the ventilation duct. The outer portion of the circular flange is pressed into the corresponding channel defined in the outlet assembly by moving the outlet assembly toward the duct in a direction generally parallel to the direction of airflow exiting the duct and outlet assembly. The flow of air travels and applies a force in a direction that is opposite to the connection direction and thereby gradually weakens the connection.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a ventilation duct for a motor vehicle includes an air inlet, a duct body, and a duct opening generally in a shape of a quadrilateral having first, second, third, and fourth sides. The duct opening further includes a generally L-shaped extension extending away from the first and second sides of the duct body and having an inner surface, an outer surface, a first end, and a second end, a first seal affixed to the inner surface of the generally L-shaped extension, the first seal extending around the first end of the L-shaped extension to cover a first portion of the outer surface of the L-shaped extension and around the second end of the L-shaped extension to cover a second portion of the outer surface L-shaped extension. The ventilation further includes an outlet generally in the shape of the quadrilateral of the duct opening, the outlet having first, second, third, and fourth sides. The outlet further includes an outlet assembly, a generally L-shaped seal extension having a first portion extending radially away from the third and fourth sides of the outlet assembly and a second portion extending longitudinally away from the first portion, the first portion and the second portion having an inner surface and an outer surface, the first portion having a first end and a second end, and a second seal affixed to the inner surface of the first and second portions of the generally L-shaped seal extension, the second seal extending around the first end of the first portion of L-shaped extension to cover a first portion of the outer surface of the first portion of L-shaped seal extension and around the second end of the first portion of the L-shaped seal extension to cover a second portion of the outer surface of the first portion of the L-shaped seal extension.

According to another aspect, a method of assembling a ventilation duct including an air inlet, a duct body, and a duct opening having a generally L-shaped extension extending away from the duct body, and an outlet comprising an outlet assembly having a generally L-shaped seal extension having a first portion extending radially away from the outlet assembly and a second portion extending longitudinally away from the first portion is disclosed. The method includes the steps of affixing a first seal to an inner surface of the generally L-shaped extension, the first seal extending around a first end of the L-shaped extension to cover a first portion of the outer surface of the L-shaped extension and around a second end of the L-shaped extension to cover a second portion of the outer surface L-shaped extension, affixing a second seal to an inner surface of the first and second portions of the generally L-shaped seal extension, the second seal extending around a first end of the first portion of L-shaped extension to cover a first portion of an outer surface of the first portion of L-shaped seal extension and around a second end of the first portion of the L-shaped seal extension to cover a second portion of the outer surface of the first portion of the L-shaped seal extension, and installing the outlet in the duct opening in a direction perpendicular to an airflow direction of air through the duct opening, the first seal abutting the second seal to prevent air leakage.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures in which like reference numbers indicate identical or functionally similar elements. Also in the figures, the left most digits of each reference number corresponds to the figure in which the reference number is first used.

Figure 1:
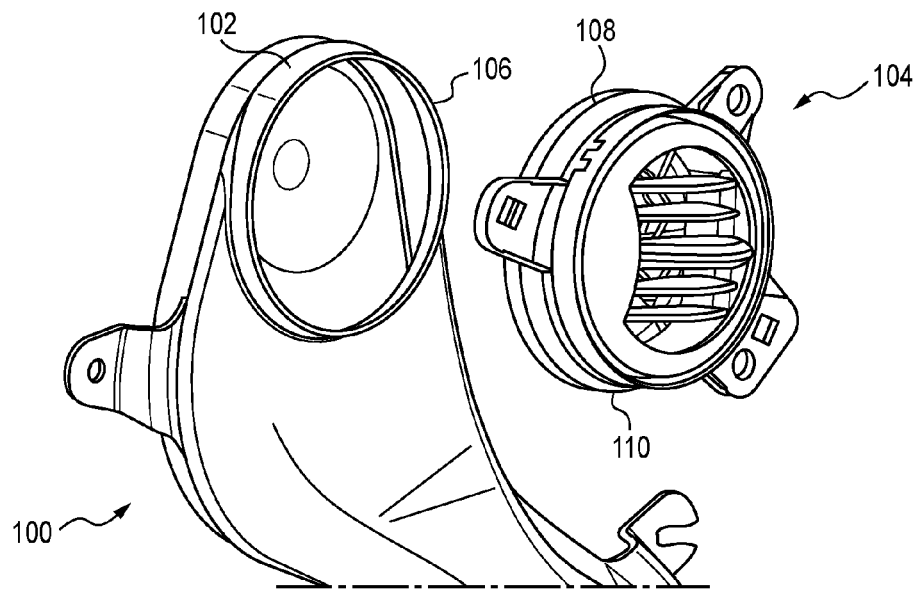
FIG. 1 is an exploded view of a prior art ventilation duct.
Figure 2:
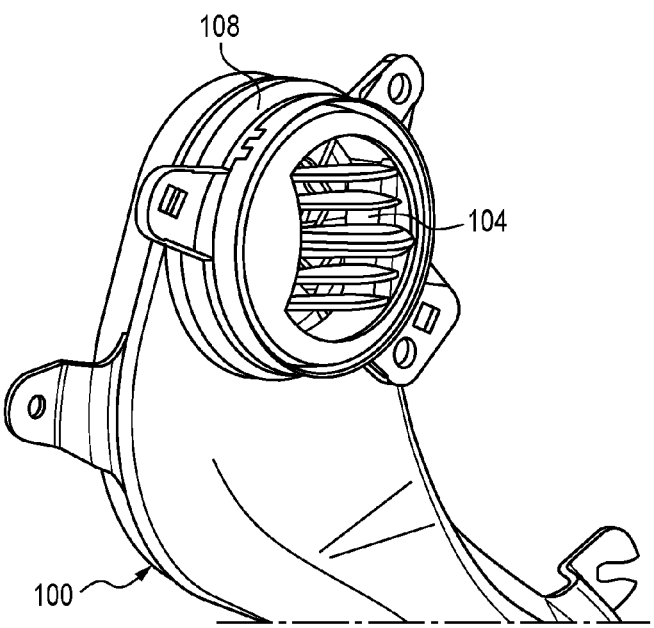
FIG. 2 is a perspective view of the prior art ventilation duct.

As illustrated in FIGS. 1-2, the related art ventilation duct 100 defines a circular flange 102 that connects to a corresponding circular outlet assembly 104. This connection is facilitated by extending an outer portion 106 of the circular flange 102 within a corresponding channel (not shown) defined in the outlet assembly 104, and in particular in a circular ethylene propylene rubber seal 108 that extends around the perimeter 110 of outlet assembly 104 facing the air duct 100. The outer portion 106 of the circular flange 102 is pressed into the corresponding channel defined in the outlet assembly 104 by moving the outlet assembly 104 toward the duct 100 in a direction generally parallel to the direction of airflow exiting the duct 100 and outlet assembly 104.

FIGS. 3-11 illustrate an embodiment of a vehicle air ventilation duct 300 that is connected to an outlet 500 by relative movement of a duct body 302 and the outlet 500 in a direction that is generally perpendicular to direction of airflow, designated by arrow F, exiting the ventilation duct 300 and outlet 500.

Figure 4:
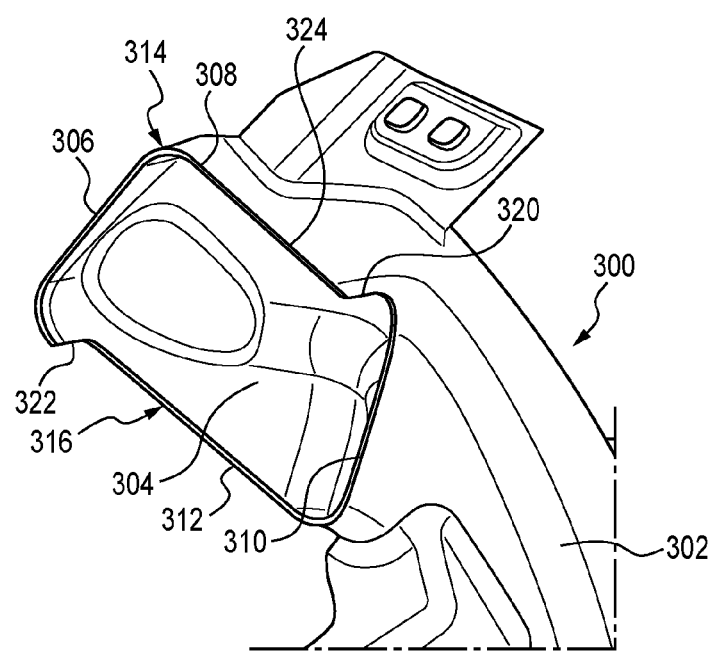
FIG. 4 is a side perspective view of the ventilation duct of FIG. 3
Figure 5:
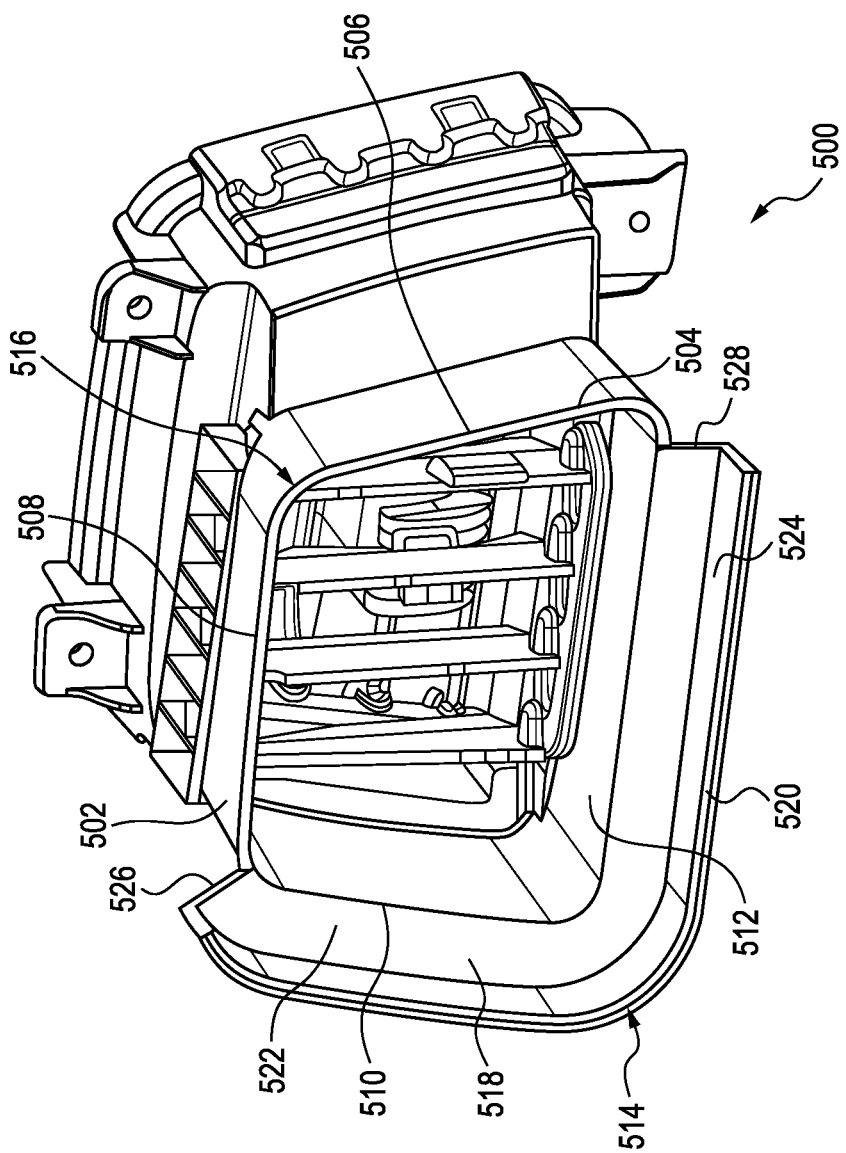
FIG. 5 is a side perspective view of an embodiment of an outlet.
Figure 6:
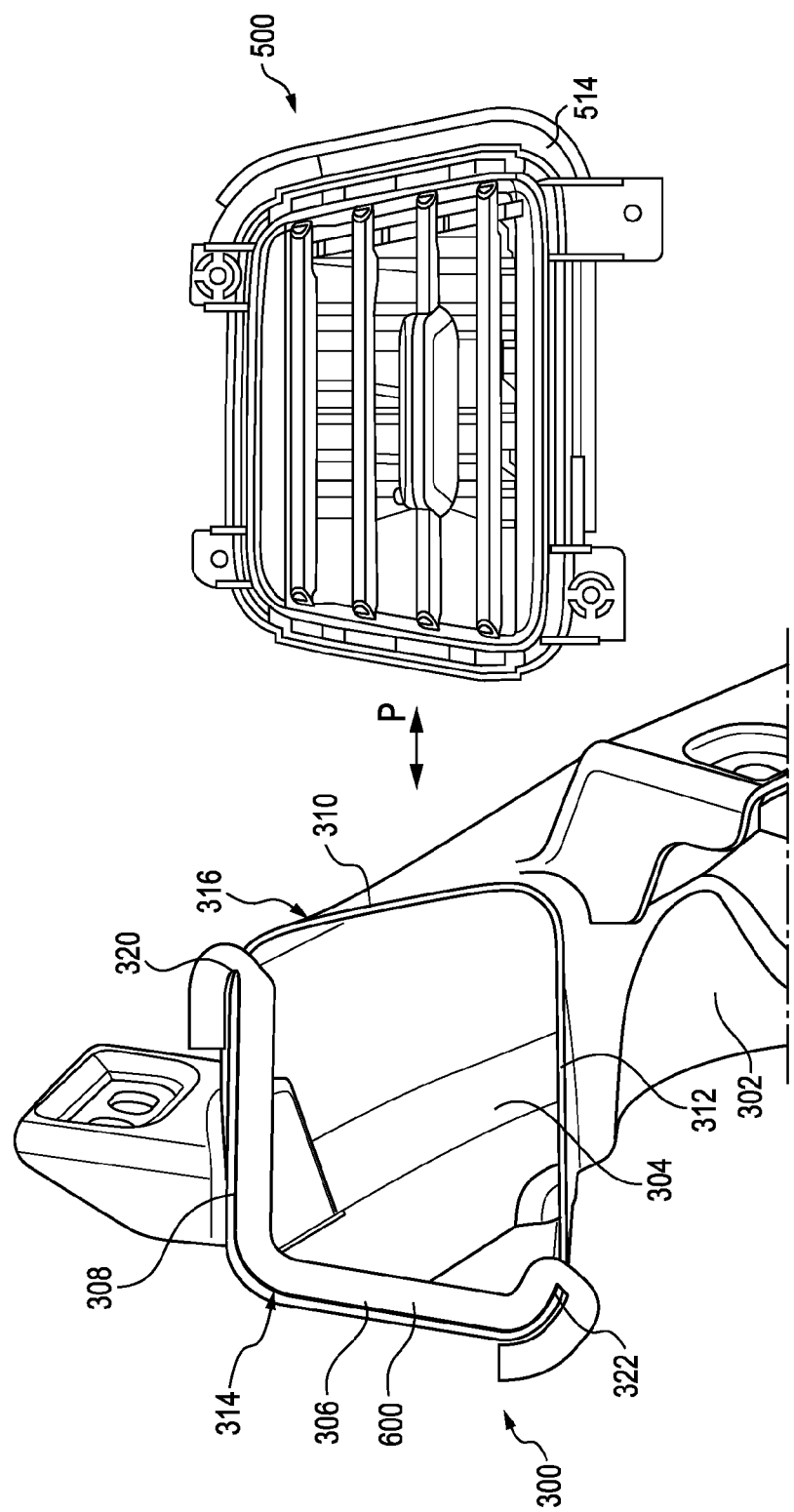
FIG. 6 is a front view of an exploded view of the ventilation duct.

As illustrated in the FIGS. 3-7, the duct opening 304 of the air duct body 302 is generally quadrilateral in shape in front plan view, illustrated particularly in FIG. 6. In the embodiment shown in FIGS. 3-7, the quadrilateral shape of the duct opening 304 is generally trapezoidal in shape, with a first side 306, a second side 308, a third side 310, and a fourth side 312. The duct opening 304 of the ventilation duct 300 is also stepped, and in particular includes two connected sides, the first and second sides 306, 308, that form a generally L-shaped extension 314 that extends beyond the remaining two connected sides, the third and fourth sides 310, 312, which form an L-shaped indentation 316.

The outlet 500 includes an outlet assembly 502, which further includes the mating face 504 of the outlet assembly 502 similarly forms a stepped quadrilateral similar to that of the duct opening 304. In the embodiment illustrated in FIG. 5, as with the duct opening 304, the mating face 504 of the outlet assembly 502 is generally trapezoidal in shape with a first side 506, a second side 508, and third side 510, and a fourth side 512 corresponding with the first side 306, second side 308, third side 310, and fourth side 312 of the duct opening 304. In particular, the mating surface 504 of the outlet assembly 502 includes two connected sides, the third side 510 and fourth side 512 as illustrated in FIG. 5, that form a generally L-shaped extension 514 that projects beyond the remaining two connected sides, which are the first side 506 and the second side 508 as illustrated in FIG. 5, which form an L-shaped indentation 516. In the illustrated embodiment, the L-shaped extension 514 of the outlet assembly 502 includes a first portion that 518 extends radially outward from the third and fourth sides 510, 512 of the outlet assembly 502 and a second portion 520 that extends longitudinally away from the first portion 518. The L-shaped extension 514 of the outlet assembly 502 extends within the L-shaped indentation 316 of the duct opening 304, while the L-shaped extension 314 of the duct opening 304 extends within the L-shaped indentation 516 of the outlet 500.

Figure 3:
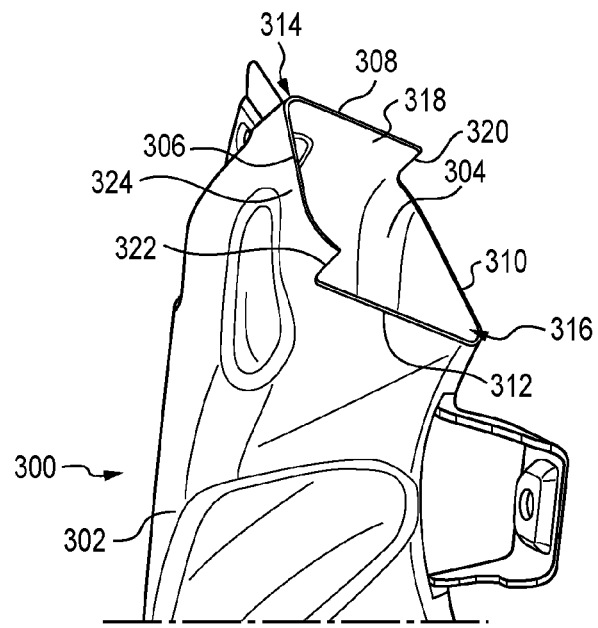
FIG. 3 is a bottom perspective view of an embodiment of a ventilation duct.
Figure 7:
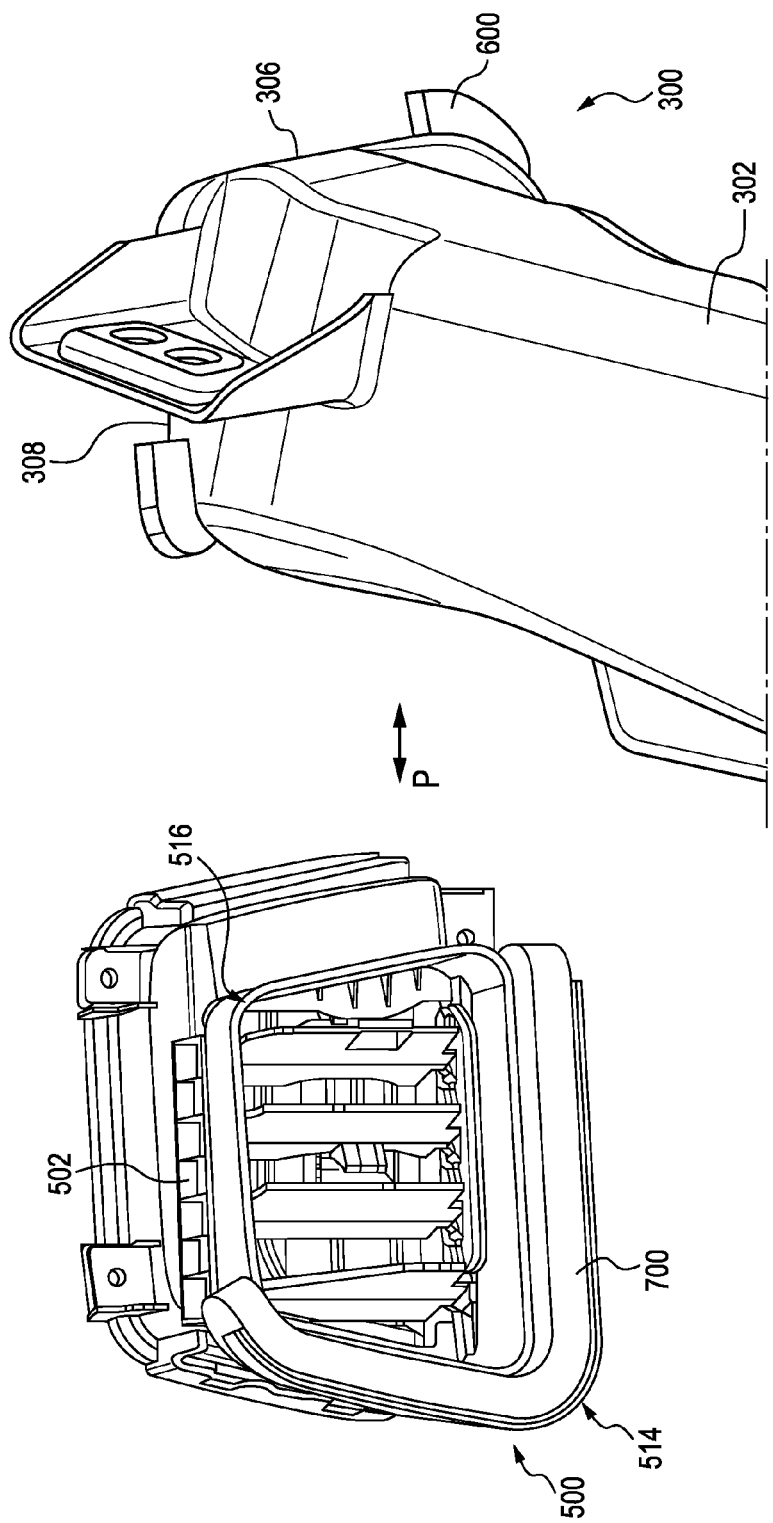
FIG. 7 is a rear view of an exploded view of the ventilation duct of FIG. 6.
Figure 8:
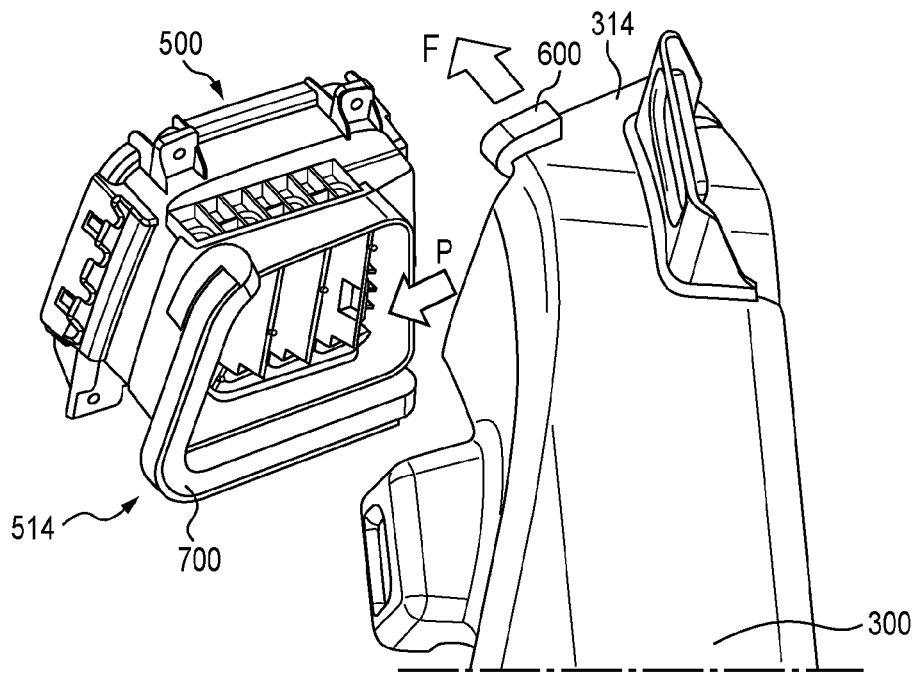
FIG. 8 is a rear view an illustration of the assembly of the ventilation duct.
Figure 9:
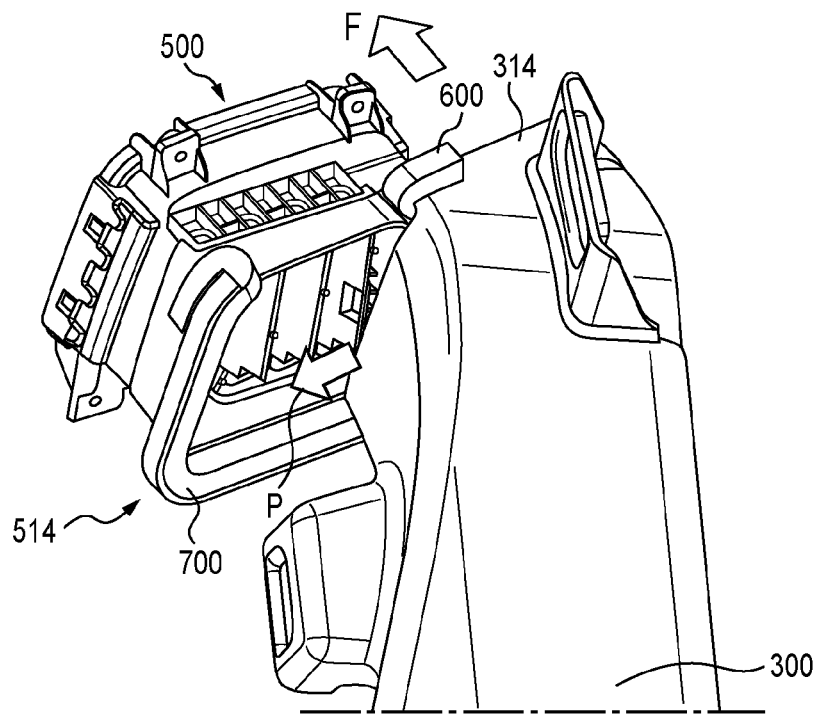
FIG. 9 is a rear view an illustration of the assembly of the ventilation duct.
Figure 10:
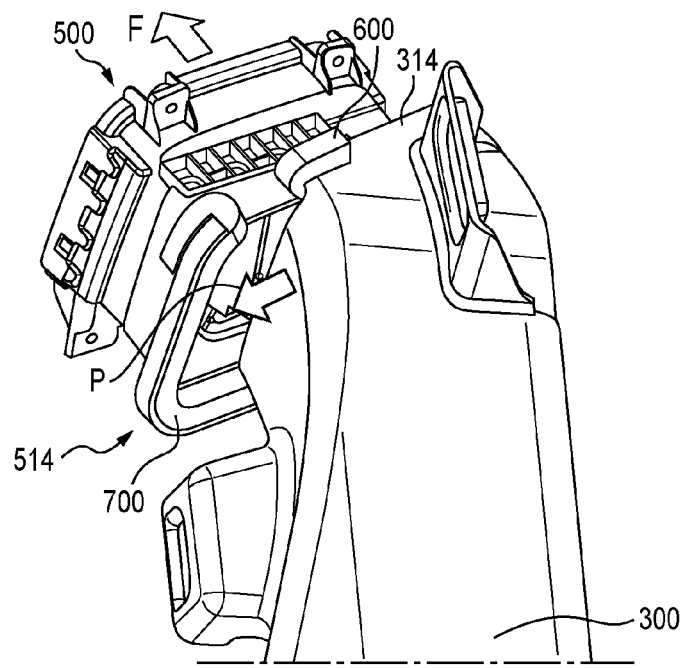
FIG. 10 is a rear view an illustration of the assembly of the ventilation duct.
Figure 11:
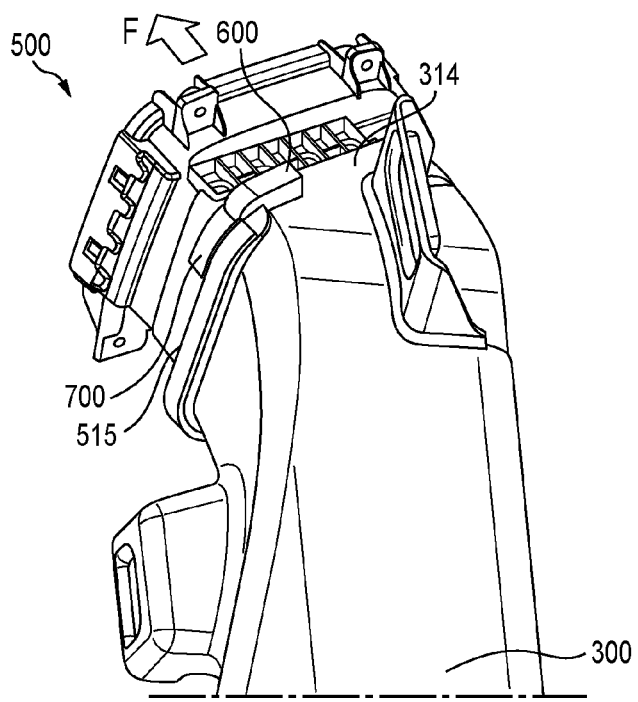
FIG. 11 is a rear view an illustration of the assembly of the ventilation duct.

As illustrated in FIGS. 6-7, a first seal 600 extends around the L-shaped extension 314 of the duct opening 304, and in particular over an inner surface 318 of the L-shaped extension 314 facing the outlet 500, illustrated in FIGS. 3-4, and loops around the edges 320, 322 of the L-shaped extension 314 to cover a portion of the outer surface 324.

A second seal 700 similarly extends around the L-shaped extension 514 of the outlet assembly 502, contacting the inner surfaces 522, 524 of both the first and second portions 518, 520 facing the duct opening 304, and loops around each end 526, 528 of the first portion of the L-shaped extension 514, illustrated in FIG. 5.

The first seal 600 and second seal 700 are constructed of an ethylene propylene rubber, preferably ethylene propylene diene-terpolymer (EPT).

As shown in FIGS. 8-11, relative movement between the ventilation duct 300 and outlet 500 in a direction, designated by arrow P, generally perpendicular to the direction of airflow F, connects these components 300, 500 together.

The L-shaped extensions 314, 514 with the first and second seals 600, 700 constitute nesting features that connect the duct opening 304 and outlet assembly 502 together in an airtight manner so that air exits the duct opening 304 and enters and exits the outlet 500 through the outlet assembly 502, and does not leak out between the duct opening 304 and the outlet 500. The nesting of the L-shaped extensions 314, 514 that enable the duct body 302 to be connected to the outlet 500 by relative motion that is perpendicular P to the airflow direction F is beneficial for a variety of reasons. First, durability of the connection is be achieved by virtue of the fact that the airflow F does not apply a force that is directly counter or opposite to the force of attachment. Additionally, the cooperating L-shaped extensions 314, 514 simplify assembly by making it easy to identify the appropriate relative orientations of the surfaces for attachment.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A ventilation duct for a motor vehicle, comprising:
   an air inlet;
   a duct body;
   a duct opening generally in a shape of a quadrilateral having first, second, third, and fourth sides, the duct opening further comprising:
      a generally L-shaped extension extending away from the first and second sides of the duct body and having an inner surface, an outer surface, a first end, and a second end;
      a first seal affixed to the inner surface of the generally L-shaped extension, the first seal extending around the first end of the L-shaped extension to cover a first portion of the outer surface of the L-shaped extension and around the second end of the L-shaped extension to cover a second portion of the outer surface L-shaped extension; and an outlet generally in the shape of the quadrilateral of the duct opening, the outlet having first, second, third, and fourth sides, the outlet further comprising:
an outlet assembly;
a generally L-shaped seal extension having a first portion extending radially away from the third and fourth sides of the outlet assembly and a second portion extending longitudinally away from the first portion, the first portion and the second portion having an inner surface and an outer surface, the first portion having a first end and a second end; and
a second seal affixed to the inner surface of the first and second portions of the generally L-shaped seal extension, the second seal extending around the first end of the first portion of L-shaped extension to cover a first portion of the outer surface of the first portion of L-shaped seal extension and around the second end of the first portion of the L-shaped seal extension to cover a second portion of the outer surface of the first portion of the L-shaped seal extension.

2. The ventilation duct of claim 1 wherein the outlet is nested with the duct opening such that the first seal contacts the first and second sides of the outlet and the second seal contact the third and fourth sides of the duct opening.

3. The ventilation duct of claim 2 wherein the quadrilateral is generally a trapezoid.

4. The ventilation duct of claim 2 wherein the first seal and second seal each comprise:
ethylene propylene rubber.

5. The ventilation duct of claim 4 wherein the ethylene propylene rubber comprises ethylene propylene diene-terpolymer.

* * * * *